(12) United States Patent
Bujak, Jr.

(10) Patent No.: US 6,591,901 B2
(45) Date of Patent: Jul. 15, 2003

(54) ADVANCED STARTING CONTROL FOR HEATING/COOLING SYSTEMS

(75) Inventor: Walter E. Bujak, Jr., Suffield, CT (US)

(73) Assignee: Carrier Corporation, Syracuse, WA (US)

( * ) Notice: Subject to any disclaimer, the term of this patent is extended or adjusted under 35 U.S.C. 154(b) by 0 days.

(21) Appl. No.: 10/212,387

(22) Filed: Aug. 6, 2002

(65) Prior Publication Data

US 2002/0185271 A1 Dec. 12, 2002

Related U.S. Application Data

(62) Division of application No. 09/572,899, filed on May 17, 2000, now Pat. No. 6,453,993.

(51) Int. Cl.$^7$ .............................. F24F 3/00; F24F 11/00
(52) U.S. Cl. ................ 165/209; 165/208; 165/220; 165/239; 62/132; 237/2 R; 237/8 A; 237/12; 700/8
(58) Field of Search ............................... 165/205, 208, 165/209, 218, 219, 220, 221, 238, 239, 236, 200; 237/2 R, 2 B, 8 A, 12; 62/56, 132, 115, 176.6, 196.1, 197, 158, 173, 175; 364/148; 700/8, 17

(56) References Cited

U.S. PATENT DOCUMENTS

| | | | | |
|---|---|---|---|---|
| 3,252,504 A | * | 5/1966 | Newton | 165/208 |
| 3,384,155 A | * | 5/1968 | Newton | 165/208 |
| 4,192,455 A | * | 3/1980 | Rasmussen et al. | 165/208 X |
| 4,487,028 A | * | 12/1984 | Foye | 62/173 X |
| 4,729,424 A | * | 3/1988 | Mizuno et al. | 62/175 X |
| 5,207,070 A | * | 5/1993 | Miyazaki | |
| 5,245,835 A | * | 9/1993 | Cohen et al. | |
| 5,303,767 A | * | 4/1994 | Riley | |
| 5,467,604 A | * | 11/1995 | Sekigami et al. | 62/175 X |
| 5,501,265 A | * | 3/1996 | Bujak, Jr. | |
| 5,602,758 A | * | 2/1997 | Lincoln et al. | 165/205 X |
| 5,769,314 A | * | 6/1998 | Drees et al. | 62/175 X |
| 5,875,109 A | * | 2/1999 | Federspiel | 364/148 |
| 5,927,398 A | * | 7/1999 | Maciulewicz | 165/208 X |
| 5,974,813 A | * | 11/1999 | Jeong | 62/175 X |
| 6,081,750 A | * | 6/2000 | Hoffberg et al. | 700/17 |
| 6,240,324 B1 | * | 5/2001 | Preska et al. | 700/8 |
| 6,298,677 B1 | * | 10/2001 | Bujak, Jr. | 62/158 |

FOREIGN PATENT DOCUMENTS

EP          1 113 231 A2  *  7/2001

* cited by examiner

Primary Examiner—Ljiljana Ciric
(74) Attorney, Agent, or Firm—William F. White (57) ABSTRACT

A system and method for controlling delivery of either heated or cooled water to a plurality of heat exchangers includes a system controller which gathers information as to the current and future heating or cooling demands of a plurality of zone controllers associated with the plurality of heat exchangers. The system controller is operative to provide heated or cooled water to the heat exchangers even though current heating or cooling demands may not be sufficient to require the provision of heated or cooled water to the heat exchangers. The system controller analyzes current demands for heating or cooling in combination with future demands for heating or cooling to determine if there is any combination of current and future heating or cooling demands that exceed a minimum level or number of demands necessary to authorize heating or cooling. A start time for the provision of the heated or cooled water is thereafter determined by the system controller in the event that there is any combination of current and future heating or cooling demands that exceed the minimum level or number of demands necessary to authorize a heating or cooling. The system controller is also operative to implement a changeover between delivery of water conditioned in one way, such as for example heating, to the delivery of water conditioned another way, such as for example cooling.

12 Claims, 9 Drawing Sheets

| ZONE "$Z_i$" | HEAT DEMAND $H\_D_i$ | COOLING DEMAND $C\_D_i$ | FUTURE SETPOINT "$S_i$" | SCHEDULED SETPOINT START TIME "$t_i$" | CURRENT ZONE TEMP. "$T_i$" | ZONE HEAT FACTOR "$H_i$" | ZONE COOLING FACTOR "$C_i$" | TIME REQUIRED TO ACHIEVE HEAT SETPOINT $\Delta t_{hi}$ | TIME REQUIRED TO ACHIEVE COOL SETPOINT $\Delta t_{ci}$ | HEAT START TIME $t_{hi}$ | COOL START TIME $t_{ci}$ |
|---|---|---|---|---|---|---|---|---|---|---|---|
| $Z_1$ | $H-D_1$ | $C-D_1$ | $S_1$ | $t_1$ | $T_1$ | $H_1$ | $C_1$ | $\Delta t_{h1}$ | $\Delta t_{c1}$ | $t_{h1}$ | $t_{c1}$ |
| $Z_2$ | $H-D_2$ | $C-D_2$ | $S_2$ | $t_2$ | $T_2$ | $H_2$ | $C_2$ | $\Delta t_{h2}$ | $\Delta t_{c2}$ | $t_{h2}$ | $t_{c2}$ |
| ⋮ | ⋮ | ⋮ | ⋮ | ⋮ | ⋮ | ⋮ | ⋮ | ⋮ | ⋮ | ⋮ | ⋮ |
| $Z_n$ | $H-D_n$ | $C-D_n$ | $S_n$ | $t_n$ | $T_n$ | $H_n$ | $C_n$ | $\Delta t_{hn}$ | $\Delta t_{cn}$ | $t_{hn}$ | $t_{cn}$ |

ADVANCED STARTING CONTROL FOR HEATING/COOLING SYSTEMS

This application is a division, of application Ser. No. 09/572,899 filed May 17, 2000, now U.S. Pat. No. 6,453,993 B1, issued Sep. 24, 2002.

This invention relates to systems which employ water as a heat exchange medium so as to add or remove heat from various parts of a building that are to be heated or cooled.

It is desirable that a system for heating or cooling various parts of a building be capable of responding to different demands for heating or cooling throughout the building at any time of the day or night. It is moreover desirable that such a system be capable of responding to reduced demands for heating or cooling during evening or nighttime hours when various parts of the building may not be occupied. It is also desirable that these same parts of the building be brought up or down to comfortable temperature levels during occupancy. This need to meet comfort levels during occupancy can present particular problems in a system using water as the preferred heat exchange medium in adding or extracting heat from the various parts of a building. In this regard, water in such a system may need to be first heated or cooled by appropriate equipment and thereafter circulated in advance of occupancy in order to meet the desired comfort levels during occupancy. This need to first heat or cool the water poses particular problems when the system must transition from providing temperature conditioned water of a first type to providing temperature conditioned water of a second type.

It is an object of the invention to provide a control for a system employing water as a heat exchange medium which will provide either heated or cooled water to parts of a building in advance of occupancy.

SUMMARY OF THE INVENTION

The present invention includes a controller for a system providing conditioned water to preferably a number of individual heat exchangers. The controller gathers information from local dedicated controllers for each of the heat exchangers. The gathered information includes the current heating or cooling demand by each such local controller as well as the current zone temperature for the space to be heated or cooled by the local heat exchanger. The gathered information furthermore includes the next future setpoint for the zone and associated start time for the future setpoint.

The controller preferably creates an array of the thus received information by zone. The controller furthermore uses the received information that has been organized by zone to compute several additional pieces of information for each particular zone that is preferably stored in additional fields within the array. The additional pieces of information include time required to achieve a heat setpoint for the particular zone, time required to achieve a cool setpoint for the particular zone, a heat start time and a cool start time.

The controller preferably first computes the percentage of dedicated local controllers currently having heating demands and the percentage of zone controllers currently having cooling demands. The controller next determines whether the computed percentage heating requirement is greater than the percentage cooling requirement. In the event that the percentage heating requirement is greater than the percentage cooling requirement, then the controller preferably inquires as to whether the particularly dominant heating requirement is greater than a minimum heating demand requirement. In the event that the percentage cooling requirement is greater than the percentage heating requirement, then the controller inquires as to whether the particularly dominant cooling requirement is greater than a minimum cooling requirement.

In the event that the dominant percent heating or cooling requirement is not greater than the respective minimum demand level, than the processor will proceed to an advance start routine. The advance start routine will determine whether or not there are anticipated demands in the future that might be sufficient to produce a future heating or cooling requirement that would be greater than the respective minimum level of demand. If a future heating or cooling requirement is greater than its respective minimum requirement, then the controller will proceed to determine the earliest start time that would produce a future heating or cooling requirement that just exceeds the respective minimum demand level.

The setting of a system demand either equal to heating or equal to cooling either by virtue of the original comparison of present heating or cooling demands with respect to minimum requirements or the computed future heating and cooling demands with respect to the minimum requirements may not however result in the immediate provision of the conditioned water being demanded. The system will first check to see whether the currently active heating or cooling equipment has run for a minimum time period if there is to be a change over to the other type of equipment. When this minimum time period has expired and the particular active equipment has been stopped, the control will preferably inquire as to whether a particular water temperature in the return line is within a range of temperatures. The system may also inquire as to whether a particular period of time has elapsed since the previous activated equipment was turned off. It is only after the return water temperature is within range or the period of time since turning off the previously activated equipment has elapsed, if the later has occurred, that the controller will proceed to actually authorize the start up of the particular heating or cooling equipment pursuant to the setting of the system demand in accordance with the aforementioned computation of either present or future demand requirements for either heating or cooling.

BRIEF DESCRIPTION OF THE DRAWINGS

For a fuller understanding of the present invention, reference should now be made to the following detailed description thereof taken in conjunction with the accompanying drawings wherein.

DESCRIPTION OF THE PREFERRED EMBODIMENTS

Figure 1:
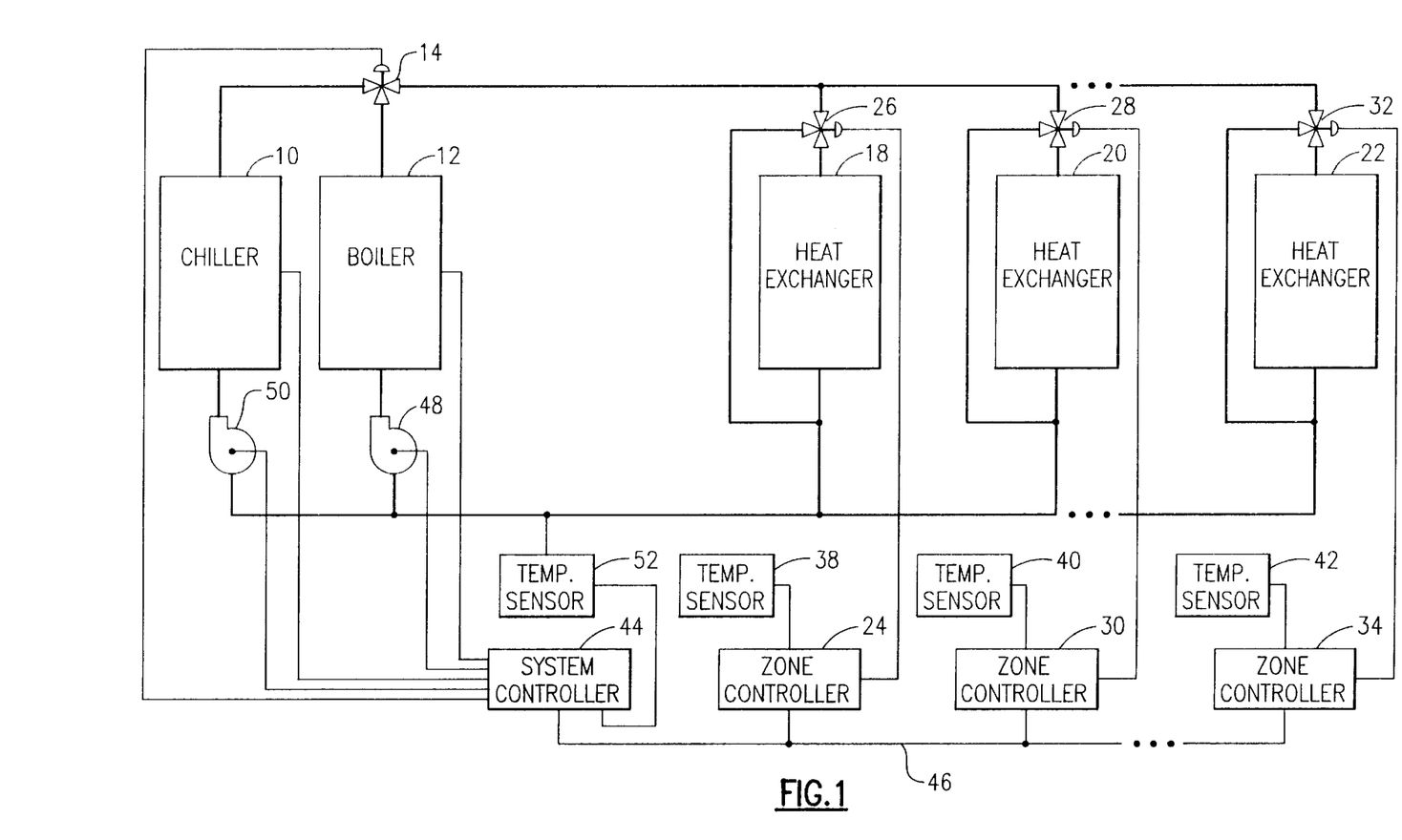
FIG. 1 is a schematic view of a system having both a chiller and a boiler for delivering cooled or heated water to heat exchangers and a system controller and a series of zone controllers associated therewith.

Referring now to FIG. 1, a system employing water as a heat exchanger medium is seen to include a chiller 10 and a boiler 12. Hot water from the boiler 12 may flow through a two-position changeover valve 14 to heat exchangers 18, 20 and 22. Alternatively, the chiller 10 may deliver chilled water to the heat exchangers 18, 20 and 22 via the two position valve 14. It is to be understood that each heat exchanger may use the delivered water to condition air in a space that is to be heated or cooled. This is often referred to as a "zone of heating or cooling". Water from either the chiller 10 or the boiler 12 flows through the heat exchanger 18 in the event that a zone controller 24 authorizes such a flow by positioning of a control valve 26. The zone controller 24 may also divert any water flow around the heat exchanger 18 by a further positioning of the control valve 26. It is to be appreciated that the heat exchanger 20 operates in a similar fashion in response to the positioning of a control valve 28 under the control of a zone controller 30. It is furthermore to be appreciated that the last heat exchanger 22 in the system will also be controlled by the positioning of a control valve 32 under the control of a zone controller 34. Water flow to each heat exchanger within each corresponding can either fully bypass the heat exchanger, fully flow through the heat exchanger, or partially flow through the heat exchanger and bypass. The control valve position is determined by the zone controller and is a function of the zone's heating or cooling requirement and the operating mode of the water loop. Each zone controller 24, 30 and 34 is also connected to a corresponding temperature sensor such as 38, 40 and 42, which senses the temperature in the respective zone serviced by the heat exchanger and provides such temperature information to the respective zone controller. Each zone controller will furthermore have stored setpoint values for the particular zone. These may be temperatures that are arbitrarily defined by an individual either through a programmable thermostat or other device suitable for entering setpoint information. Each zone controller will either have a demand for heat or a demand for cooling or essentially a demand for neither heating or cooling depending on the sensed temperature in the zone versus the zone's currently active setpoint. Each zone controller will also preferably include information concerning future setpoints. This information will include setpoint values in whatever degree temperature system being used and the times these setpoints are to take effect.

Information concerning each individual zone controller is provided to a system controller 44 via a bus 46. The system controller 44 controls pumps 48 and 50 so as to thereby pump return water from the heat exchangers 18, 20 and 22 into either the boiler 12 or the chiller 10. It is to be appreciated that only one of the two pumps 48 or 50 will be activated at any time by the system controller 44 so as to thereby protect the boiler or chiller from unnecessary exposure to return water not having the proper temperature range for the operation of the respective equipment. In order to assure that the proper temperature range is present in the return line, a temperature sensor 52 senses the return water temperature and provides the same to the system controller 44.

Figure 2A:
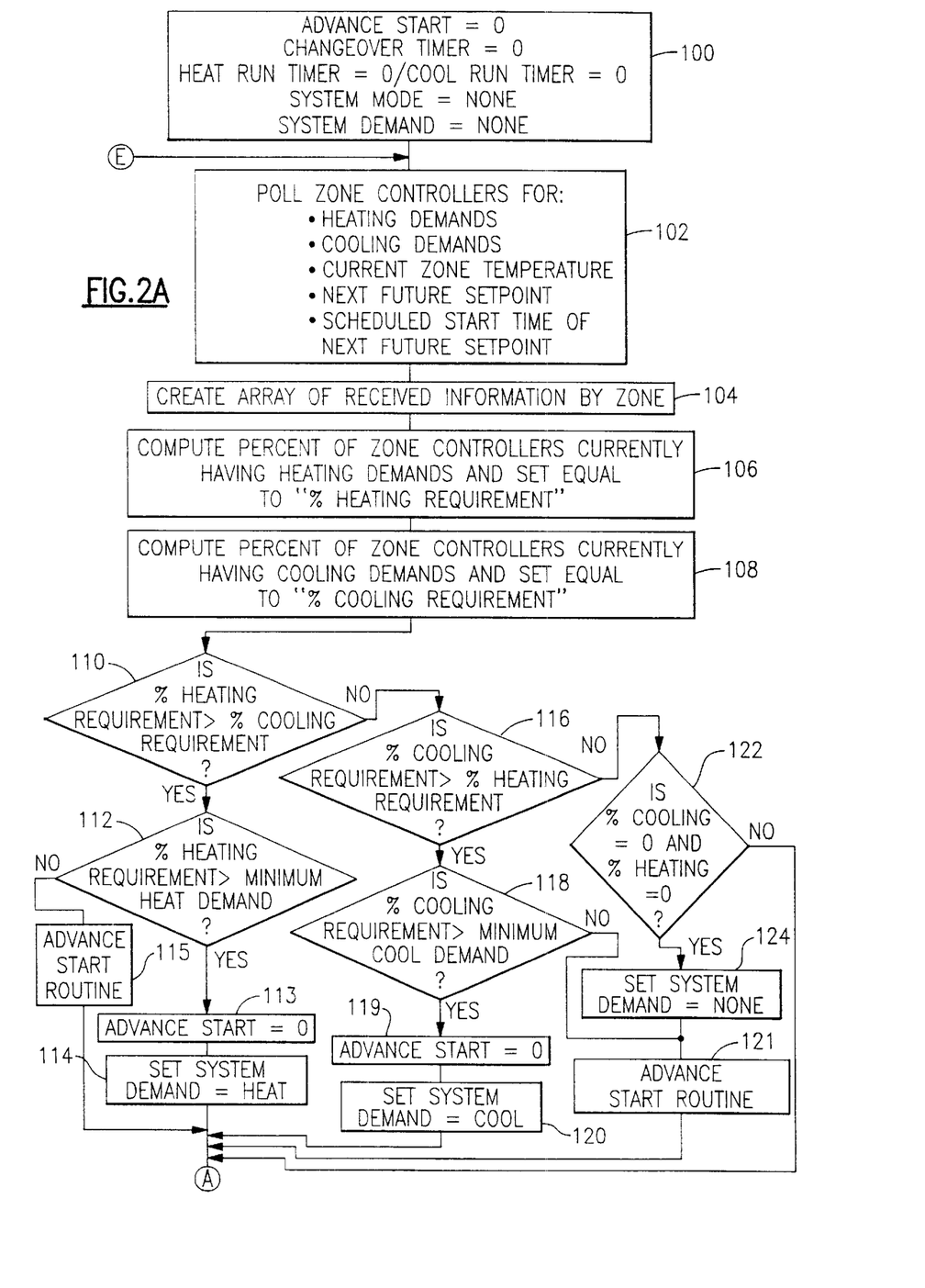
FIGS. 2A–2C are a flow chart of the method used by the system controller within FIG. 1 so as to control the activation or deactivation of the chiller or the boiler of FIG. 1.
Figure 2B:
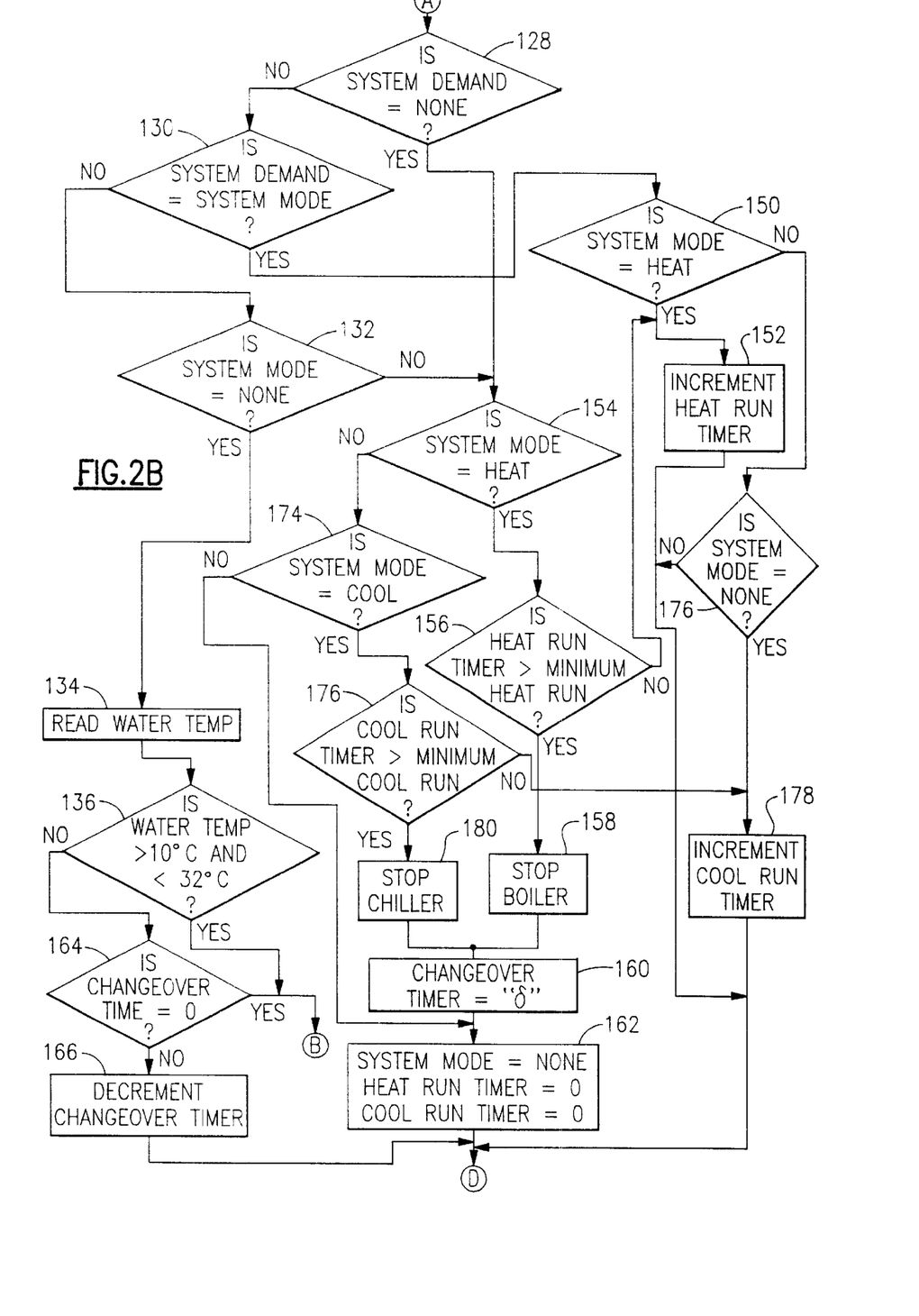
Figure 2C:
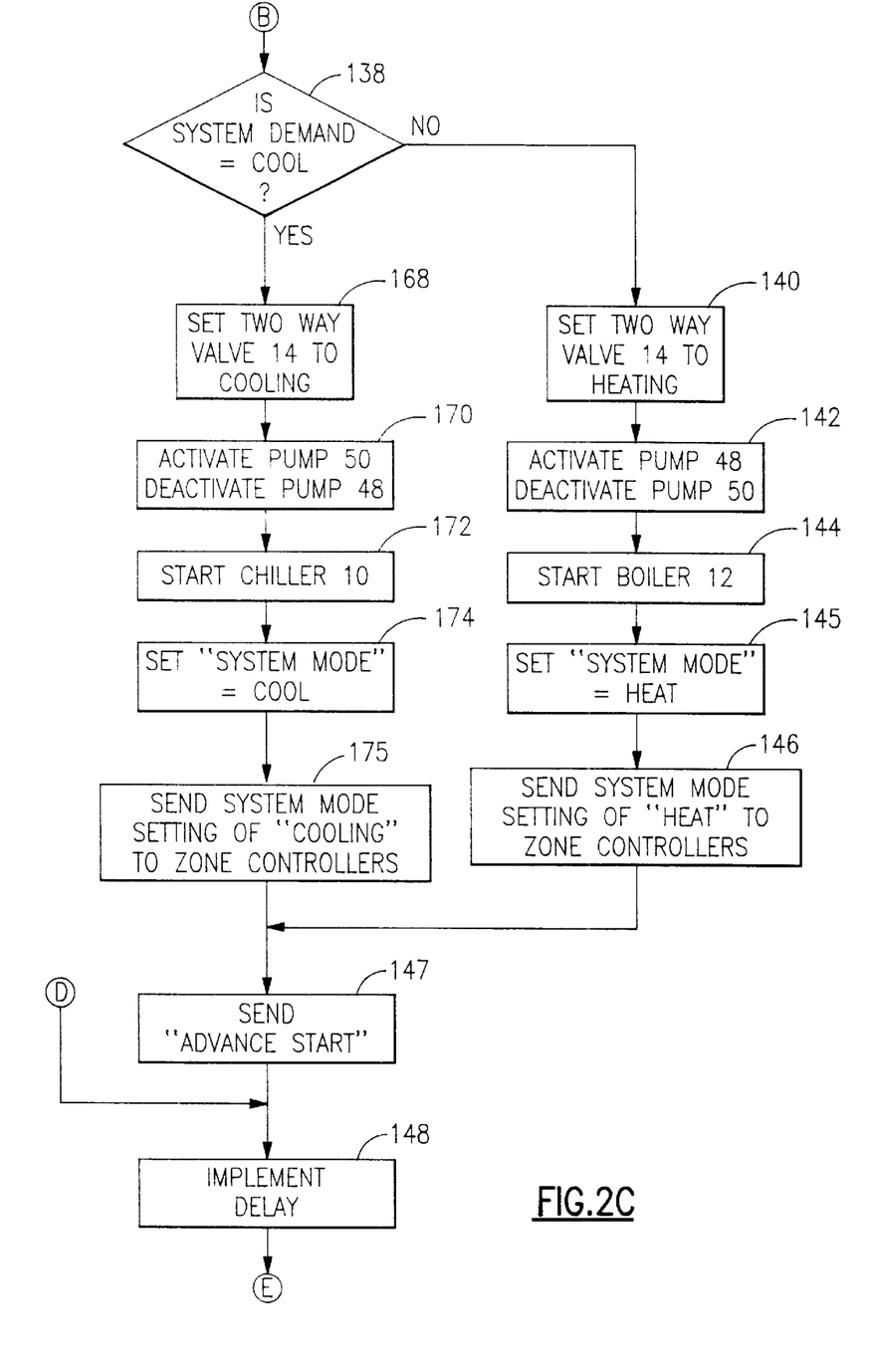

Referring now to FIGS. 2A, 2B, and 2C, a process utilized by a programmable microprocessor within the system controller 44 is illustrated. The process begins with an initialization step 100, which sets the initial values of the following variables: "advance start", "changeover timer", "heat run timer", "cool run timer", "system demand" and "system mode". The microprocessor within the system controller 44 will proceed to a step 102 and poll each of the zone controllers for their respective current demands for heating or cooling, current zone temperature, next future setpoint, and associated start time for the next future setpoint. It is to be appreciated that this is preferably done by addressing each zone controller 24, 30 and 34 via the bus 46 and requesting the specific information from the zone controller. The zone information is preferably stored in a memory associated with the microprocessor within the system controller.

Figure 3:
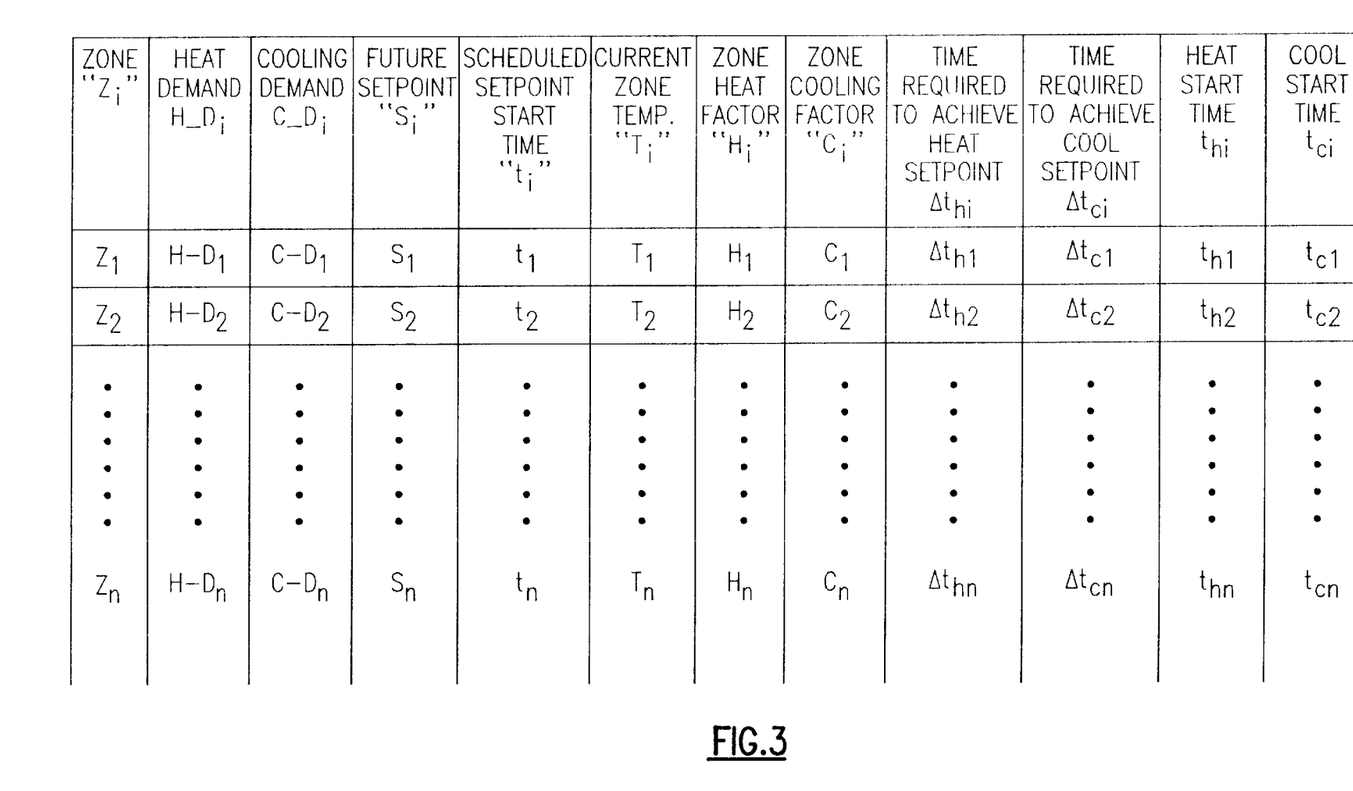
FIG. 3 is an array of information formed during execution of the logic within the flow chart of FIGS. 2A–2C.

The microprocessor proceeds to a step 104 and creates an array of received information by zone. The array of information preferably includes the received information of step 102 organized as shown in FIG. 3. The array of information in FIG. 3 also includes additional information for each zone that is not gathered as a result of polling the zone controllers in step 102. This includes a zone heat factor $H_i$ as well as a zone cooling factor $C_i$. The zone heat factor and the zone cooling factor for each respective zone are preferably already stored in memory. Alternatively, these factors could be directly read from the zone controllers themselves. Each zone heat factor is preferably a constant defining the amount of time required to raise the temperature in the zone by one degree in the temperature measurement system being used to define setpoint $S_1$ and temperature $T_i$. Each zone cooling factor is preferably a constant defining the amount of time necessary to reduce the temperature in the zone by one degree in the same aforementioned temperature system.

In addition to the aforementioned zone heating and cooling factors, the array also includes four parameters that are computed using the information gathered in step 102 as well as the zone heating and cooling factors. These parameters are as follows: time required to achieve heat set point $\Delta t_{hi}$, time required to achieve cool set point $\Delta t_{c1}$, heat start time $t_{hi}$, and cool start time $t_{ci}$.

Figure 4:
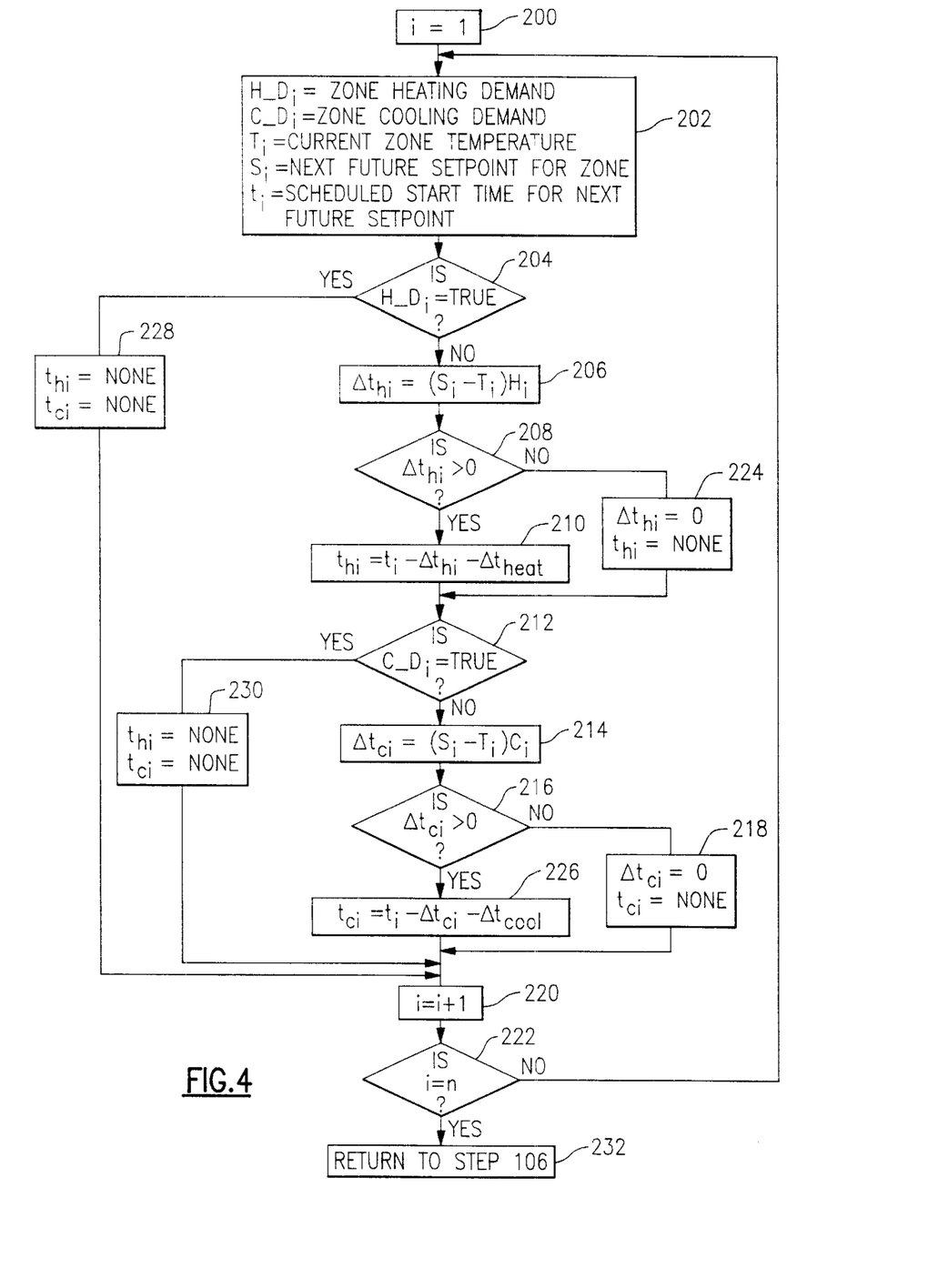
FIG. 4 is a flow chart of a routine used to produce the array of information of FIG. 3.

The array of FIG. 3 including the computed parameters may be formed by an array routine such as is disclosed in FIG. 4. The array routine begins in a step 200 wherein a zone index "i" is set equal to one. The microprocessor proceeds to a step 202 and sets the zone heating demand for the first addressed zone controller in step 102 equal to $H\_D_1$. This would be stored in the array of FIG. 3 as the heat demand $H\_D_1$. It is to be noted that if there is no zone heating demand, then the value of this particular stored variable would be zero. If there is a zone heating demand, then $H\_D_1$ would be set equal to TRUE. In a similar fashion, the microprocessor will read the zone cooling demand for the first addressed zone controller and store that value as $C\_D_1$ in the array location of FIG. 3. The current zone temperature for the first addressed zone controller will be stored as $T_1$ in the array of FIG. 3 whereas the next future set point for the first addressed zone will be stored as $S_1$. The scheduled start time for the next future setpoint of the first addressed zone controller will be stored in $t_1$ within the array of FIG. 3. If there is no future setpoint and associated start time, then the present setpoint and present time are stored as $S_1$ and $t_1$ respectively.

The microprocessor will proceed from step 202 to a step 204 and inquire as to whether the zone heating demand $H\_D_1$ is equal to TRUE. Assuming that there is not a present zone heating demand for the first addressed zone controller, than the microprocessor will proceed along the "no" path from step 204 to a step 206 and compute the time required to achieve heat set point for this particular zone. Referring to step 206, the time required to achieve heat set point, $\Delta t_{hi}$ is equal to the difference between the future setpoint $S_i$ and the current zone temperature $T_i$ multiplied times the heating factor $H_i$ for the particular zone. The microprocessor proceeds to a step 208 and inquires whether the computed time required to achieve heat setpoint in step 206 is greater than zero. In the event that the value of $\Delta t_{hi}$ is greater than zero, then the microprocessor will proceed to a step 210 and compute the heat start time for the particular zone. Referring to step 210, the heat start time, $t_{hi}$ is equal to the next future setpoint start time, $t_1$, minus the computed time required to achieve heat set point $\Delta t_{hi}$ which has been computed for the particular zone minus a further differential temperature $\Delta t_{heat}$. The value of $\Delta t_{heat}$ is a predefined value stored in the memory associated with the microprocessor that is typically required to heat the water to a desired temperature for operating the system of FIG. 1 in the heating mode. The temperature from which the water is to be heated is preferably the coldest temperature that the water in the return line to the boiler can be either as a result of a change over from cooling to heating or as a result of the boiler and chiller both being off for a considerable period of time in an adverse cold environment. It is to be appreciated that the value of $\Delta t_{heat}$ could also be computed as a function of the difference between the temperature of the water in the return line and the desired operating temperature for the boiler.

The microprocessor proceeds from step 210 to a step 212 and inquires as to whether the zone cooling demand $C\_D_i$ equals true for the particular zone controller. Assuming the first zone controller that has been read does not have a present cooling demand, then the microprocessor will proceed from step 212 to a step 214 and compute the time required to achieve cool setpoint identified as $\Delta t_{ci}$. Referring to step 214, $\Delta t_{ci}$ is equal to the difference of the current zone temperature $T_i$ minus the future setpoint $S_i$ times the zone cooling factor $C_i$. The processor proceeds from step 214 to a step 216 and inquires as to whether the computed value of $\Delta t_{ci}$ is greater than zero. It is to be appreciated that the value of $\Delta t_{ci}$ should be less than zero for the first zone controller if the setpoint was greater than the current zone temperature so as to allow for the computation of the time required to achieve heat setpoint in step 210. This will prompt the processor to proceed out of step 216 along a "no" path and set the value of $\Delta t_{ci}$ equal to zero and furthermore set the value of the cool start time $t_{ci}$ equal to none. The processor will proceed from step 218 to step 220 and increment the zone index "i" by one. The processor will next inquire as to whether the incremented zone index "i" is equal to "n" in a step 222. The value of "n" is the total number of zone controllers in the system of FIG. 1. Assuming that the zone index "i" is not equal to "n", then the processor will proceed back to step 202 and address the information selected in step 102 for the second read zone controller. The microprocessor will proceed to step 204 and inquire as to whether the zone heating demand read from the second addressed zone controller is equal to TRUE. Assuming that there is no present heat demand for the second read zone controller, then the processor will proceed to compute the time required to achieve heat setpoint $\Delta t_{h2}$ in step 206. Assuming that the future setpoint for the second read zone controller is less than the current zone temperature $T_2$, then the value of $\Delta t_{h2}$ will be less than zero. This will prompt the processor to proceed along "no" path out of step 208 to a step 224 and set the value of $\Delta t_{h2}$ equal to zero and the value of the heat start time $tR_2$ equal to none.

The processor will proceed from step 224 to step 212 and inquire as to whether the zone cooling demand $C\_D_2$ is equal to true. Assuming there is no present zone cooling demand, then the processor will proceed to step 214 and compute the value of $\Delta t_{c2}$. Since the value of the future setpoint $S_2$ for the second zone controller is less than the current zone temperature, the value of $\Delta t_{c2}$ should be greater than zero. The processor should therefore proceed along a "yes" path out of step 216 to step 226 and compute the value of a cool start time for this particular zone. Referring to step 226, the cool start time $t_{c2}$ is equal to the next future setpoint start time "$t_2$" minus the computed value of the time required to achieve cool setpoint, $\Delta t_{c2}$ as computed in step 214 minus a further differential time designated at $\Delta t_{cool}$. This later differential temperature $\Delta t_{cool}$ is a predefined value for the chiller of the system of FIG. 1 to cool the water to the required temperature to begin the cooling mode of operation. The temperature from which the water is to be cooled is preferably the warmest temperature that the water in the return line to the chiller can be either as a result of a changeover from heating to cooling or as a result of the boiler and chiller both being off for a consideration period of time in an adverse warm environment. It is to be appreciated that the value $\Delta t_{cool}$ could also be computed as a function of the difference between the temperature of the water in the return line and the desired operating temperature of the chiller. The processor proceeds from having computed the cool start time $t_{c2}$ to step 220 and again increments the zone index "i". Assuming again that the zone index "i" has not incremented to the last zone, the processor will proceed from step 222 along the "no" path back to step 202 following the setting of the variables in 202 equal to the respective read values for the next zone that has been previously read. The microprocessor will proceed from step 202 to step 204 and inquire as to whether the zone heating demand for this particular zone is equal to true. Assuming that the particular addressed zone controller does have a heating demand, then the processor will proceed along the "yes" path to a step 228 and set the heat start time $t_{hi}$ and the cool start time $t_{ci}$ for this particular zone equal to none. In other words, if the particular zone does have a present heating demand, then there will neither be a heat start time or a cool start time for such a zone. The microprocessor will proceed to step 220 and increment the zone index "i" again by one. Assuming that the zone index has not vet reached the final zone count of "n", the processor will again proceed back to step 202 and set the various variables for the next addressed zone controller equal to the read information for that zone. The processor will next proceed to step 204 and inquire as to whether this particular zone controller has a heating demand. In the event that it doesn't, the processor will proceed through steps 206 to steps 208 and 210 or step 224 before coming to step 212. Referring to step 212, the processor inquires as to whether there is a zone cooling demand $C\_D_i$ for the particular zone. Assuming that there is a cooling demand for this particular zone, the processor will proceed along the "yes" path out of step 212 to a step 230 and set $t_{hi}$ and $t_{ci}$ both equal to none for this particular zone. In this manner, any zone having a current cooling demand will have neither a heat start time nor a cool start time. The processor will proceed out of step 230 to step 220 and again increment the zone index by one. It is to be appreciated that at some point in time the zone index will have been incremented to the value of "n". At this point in time there will be appropriately recorded and computed values for all zones in the array of FIG. 3. The processor will proceed from step 222 to a step 232 and execute a return to step 106.

The microprocessor proceeds in step 106 to compute the percentage of zone controllers having heat demands $H\_D_t=$ TRUE. This is preferably done by first adding up the number of heating demands equal to true in the array of FIG. 3 and dividing this number by the total number, "n", of zone controllers present within the system of FIG. 1. The results are stored as "percent heating requirement". The microprocessor within the system controller proceeds to a step 108 and computes the percentage of zone controllers having cooling demands in a similar fashion. In other words, the microprocessor first adds up the number of cooling demands equal to true in the array of FIG. 3 and divides this number by the total number "n" of zone controllers in the system and stores the result as "percent cooling requirement".

The microprocessor proceeds to a step 110 and inquires whether the percent heating requirement computed in step 106 is greater than the percent cooling requirement computed in step 108. The microprocessor within the system controller 44 will proceed to step 112 in the event that the percent heating requirement exceeds the percent cooling requirement. Referring to step 112, the processor will inquire as to whether the percent heating requirement computed in step 106 is greater than a "minimum heat demand". The minimum heat demand is preferably a stored percentage value in the memory associated with the microprocessor. This percentage value should be slightly less than the percentage of zone controllers that must be demanding heat in the system of FIG. 1 in order for the system to change over to providing heated water from providing chilled water. When this percentage is exceeded, the microprocessor within the system controller will proceed in a step 113 to set "advance start" equal to zero before proceeding in a step 114 to set "system demand" equal to heat.

Figure 5A:
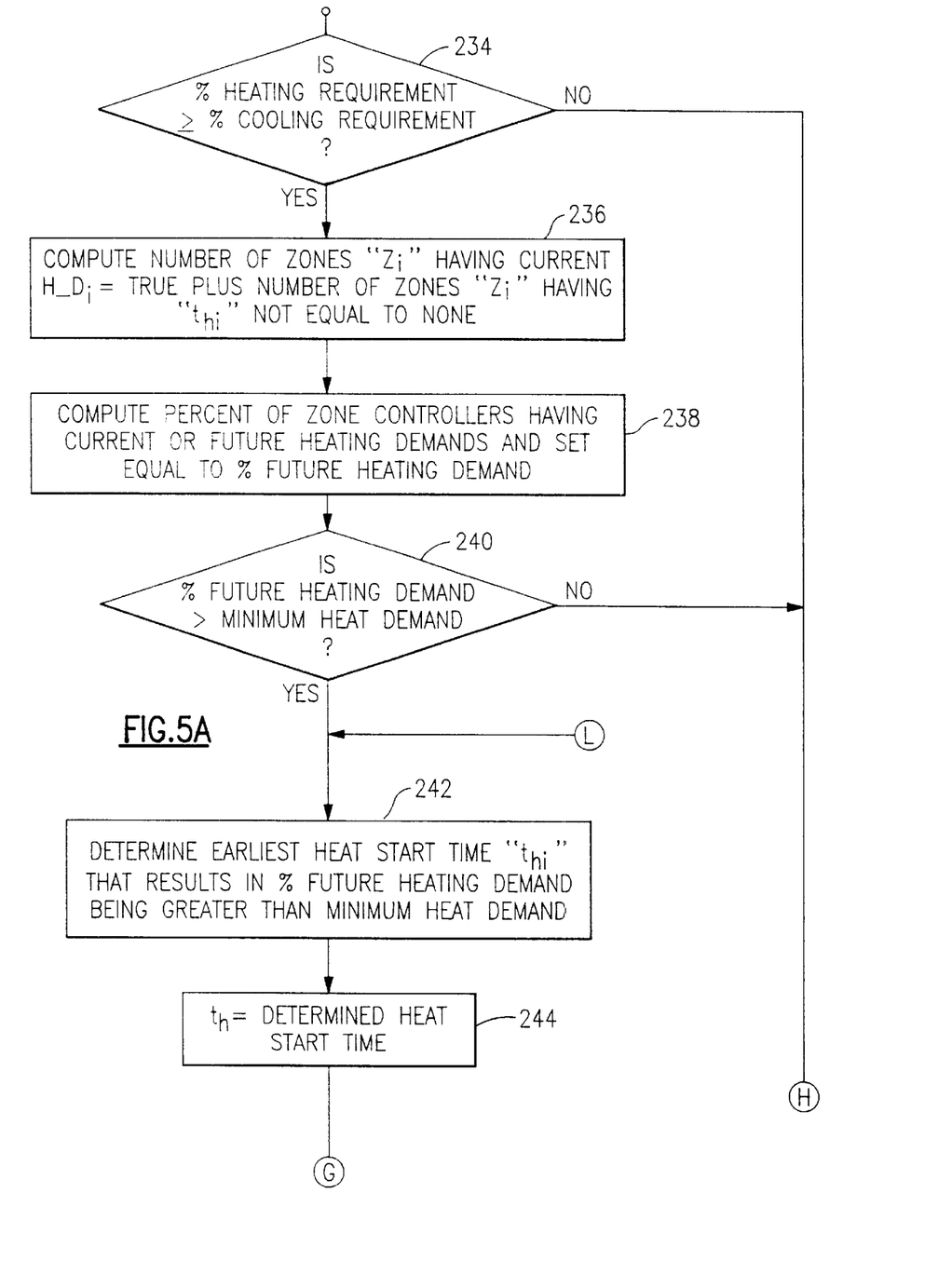
FIGS. 5A–5C are a flow chart of an advance start routine use within the flow chart of FIGS. 2A–2C.

Referring again to step 112, in the event that the percent heating requirement computed in step 106 is not greater than the minimum heat demand, then the processor will proceed along the "no" path to a step 115 and initiate an advance start routine. Referring to FIG. 5A, the advance start routine begins with a step 234, which inquires as to whether "percent heating requirement is greater than or equal to percent cooling requirement. Since the advance start routine was initiated out of step 115, the percent heating requirement will be greater than percent cooling requirement prompting the processor to proceed along a yes path to step 236. Referring to step 236, the number of zones having current heat demands $H\_D_i$ equal to true plus the number of zones having a heat start time not equal to none is computed. It is to be appreciated that this computation is preferably accomplished by scanning the created array in FIG. 3 for the number of current heat demands $H\_D_i$ equal to true and moreover the number of heat start times not equal to none. The microprocessor proceeds to step 238 and computes the percent of zone controllers having current or future heating demands. This is preferably the number of zone controllers having current or future heating demands computed in step 236 divided by the number "n" of zone controllers present within the system of FIG. 1. The computed fraction is expressed in percentage terms and is set equal to percent future heating demand in step 238. The microprocessor proceeds to a step 240 to inquire whether the percent future heating demand computed in step 238 is greater than the minimum heat demand for the system of FIG. 1. In the event that the computed percent of future heating demand is greater than the minimum requirement, the microprocessor proceeds along the "yes" path to step 242 and determines the earliest heat start time $t_{hi}$ that will produce the first percent future heating demand that is greater than the minimum heat demand. This is preferably determined by first noting the number of zones having a current $H\_D_i$ equal to true from the array of FIG. 3 and then determining how many additional zones need to have a heat start time before this minimum demand is exceeded. Depending on the number of additional zones needed, the processor will go through the array of FIG. 3 that number of times selecting the first to occur of the heat start times and then, if necessary, the next to occur heat start time until the number of zone heat start times have been gathered to meet the minimum number of zones necessary to exceed the minimum heat demand. When this occurs, the thus determined earliest heat time necessary to have the minimum number of zones exceed the minimum heat demand is set equal to "$t_h$" in step 244. The microprocessor proceeds to step 246 and reads the current time from the system clock for the controller. The current time is preferably defined in such a way so as to include more than just time of day so as to thereby account for transitions from one day to the next. This may be done by including day of the week in the system clock or by maintaining a tracking of time by minute for an entire week. Whatever is used, the start times $t_{hi}$ and $t_{ci}$ will be similarly maintained. The processor proceeds in step 248 to inquire as to whether the current time of the system clock is greater than the heat start time $t_h$ as defined in step 244. In the event that the read current system clock time is not greater than or equal to the heat start time, $t_h$, then the microprocessor will proceed along the "no" path to a step 249 and set "advance start" equal to zero before proceeding to an exit step 250. This will prompt the microprocessor to return to step 115 of the logic in FIG. 2A and proceed to whatever the next step is following step 115.

Referring again to step 248, in the event that the current time of the system clock is greater than or equal to heat start time, $t_h$, the processor will proceed to step 251 and set "system demand" equal to heat. This will essentially mean that the system of FIG. 1 is to be treated as having a sufficient number of heat demands at or after time $t_h$ so as to proceed with a possible transition to heating as will be discussed hereinafter. The processor will however make note that any such transition would be due to the advance start routine. This is accomplished by setting "advance start" equal to one in a step 252. The processor will proceed to exit step 250 and return to step 115 wherein it will proceed to the next step out of step 115.

Referring again to step 110, in the event that the percent heating requirement does not exceed the percent cooling requirement, then the processor will proceed to a step 116 and inquire as to whether percent cooling requirement is greater than percent heating requirement. In the event that the answer is yes, the processor will proceed to a step 118 and inquire as to whether the percent cooling requirement is greater than a minimum cooling demand for the system of FIG. 1. This minimum cooling demand will be slightly less than the percentage of zone controllers that must be demanding cooling in order to have the processor proceed in a step 119 to set "advance start" equal to zero before setting system demand equal to cool in a step 120.

Figure 5B:
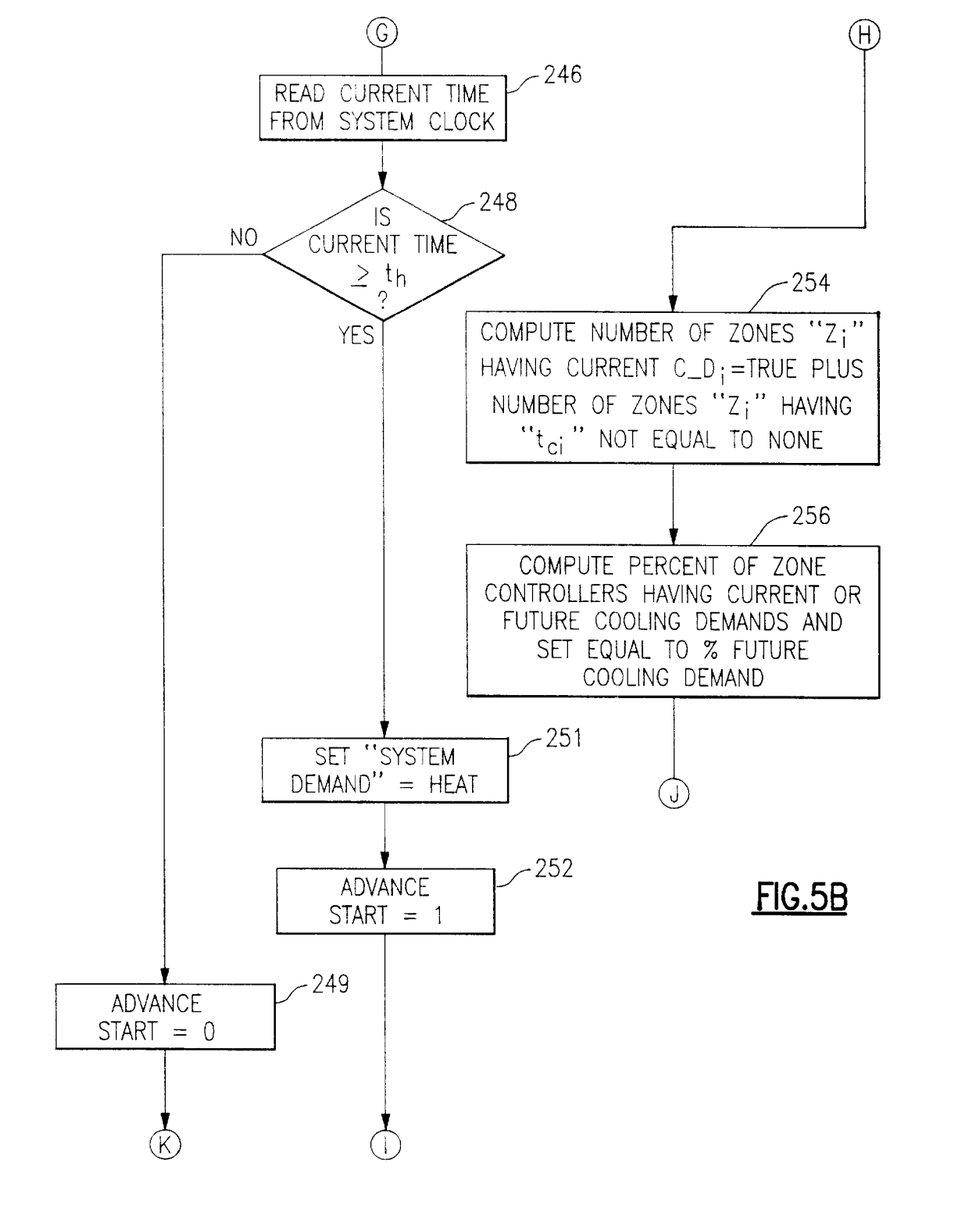
Figure 5C:
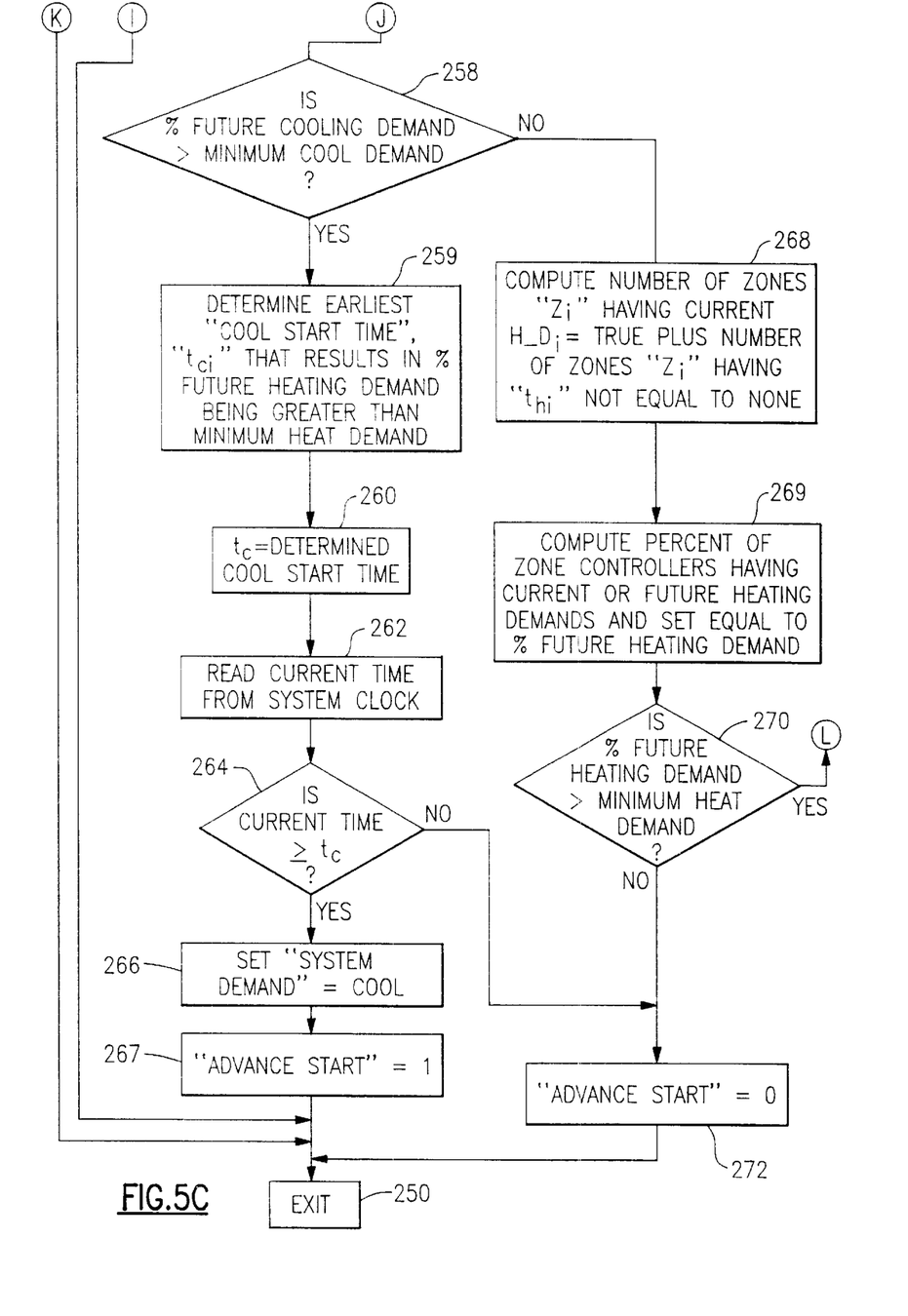

Referring again to step 118, in the event that the percent cooling requirement is not greater than the minimum cool demand, the microprocessor will proceed along the "no" path to a step 121 and initiate the advance start routine of FIGS. 5A–5C. Referring again to the advance start routine, inquiry will first be made in step 234 as to whether percent heating requirement is greater than or equal to percent cooling requirement. This will not be the case when the advance start routine is triggered as a result of the processor having entered step 121 via step 118. The processor will hence proceed along the no path out of step 234 to a step 254. Referring to step 254, the processor will compute the number of zones having current cooling demands $C\_D_i$ equal to true plus the number of zones having cool start times $t_{ci}$ not equal to none. This is preferably accomplished by scanning the number of current cooling demands $C\_D_i$ in the array of FIG. 3 that are equal to true plus the number of cool start times not equal to none. The processor proceeds in a step 256 to compute the percentage of zone controllers having current or future cooling demands. This is accomplished by dividing the computed number of zone controllers having current or future cooling demands in step 254 by the number "n" of zone controllers present within the system of FIG. 1. This computed fractional amount is converted to percentage and set equal to percent future cooling demand in step 256. The microprocessor proceeds to a step 258 and inquires whether the percent future cooling demand computed in step 256 is greater than the minimum cool demand for the system of FIG. 1. In the event that the percent future cooling demand is greater than the minimum cool demand, then the microprocessor proceeds to step 259 and determines the earliest cool start time "$t_{ci}$" that will produce the first percent future cooling demand that is greater than the minimum cool demand. This is preferably determined by first noting the number of zones having a current $C\_D_i$ equal to true from the array of FIG. 3 and then determining how many additional zones need to have a cool start time before this minimum demand is exceeded. Depending on the number of additional zones needed, the processor will go through the array of FIG. 3 that number of times selecting the first to occur of the cool start times and then if necessary the next to occur cool start time until the number of zone cool start times have been gathered to meet the minimum number of zones necessary to exceed the minimum cool demand. When this occurs the thus determined earliest cool time necessary to have the minimum number of zones exceed the minimum cool demand is set equal to $t_c$ in step 260. The processor next reads the current time from the system clock in step 262 before inquiring as to whether the thus read current time is greater than the cool start time $t_c$ in a step 264. When the current time is equal to or greater than the earliest cool start time, $t_c$, the processor proceeds to step 266 and sets system demand equal to cool before proceeding to set "advance start" equal to one in step 267. The processor proceeds to the exit step 250 and returns to step 121 wherein it proceeds to the next step following execution of step 121.

Referring again to step 258 of the advance start routine, in the event that the percent future cooling demand is not greater than the minimum cooling demand in step 258, the processor will exit step 258 along the "no" path to a step 268. Referring to step 268, the number of zones having current heat demands $H\_D_i$ equal to true plus the number of zones having a heat start time not equal to none is computed. It is to be appreciated that this computation is preferably accomplished by scanning the created array in FIG. 3 for the number of current heat demands $H\_D_i$ equal to true and moreover the number of heat start times not equal to none. The microprocessor proceeds to step 269 and computes the percent of zone controllers having current or future heating demands. This is preferably the number of zone controllers having current or future heating demands computed in step 268 divided by the number "n" of zone controllers present within the system of FIG. 1. The computed fraction is expressed in terms of percent and set equal to percent future heating demand in step 269. The microprocessor proceeds to a step 270 to inquire whether the percent future heating demand computed in step 269 is greater than the minimum heat demand for the system of FIG. 1. If the future heating demand does exceed minimum heat demand, then the processor proceeds along a yes path from step 270 to step 242. The processor will execute steps 242–250 as has been previously discussed. This could potentially result in setting "system demand" equal to heat in the event that the current system clock time is greater than or equal to the $t_h$ as determined in step 242. This would produce a system demand equal to heat and an advance start equal to one before proceeding to exit step 250. This will prompt the microprocessor to return to step 121 of the logic in FIG. 2A and proceed to whatever the next step is following step 121. It is also to be appreciated that the system clock time may not be greater than or equal to the $t_h$ determined in step 242. This would result in the processor proceeding along the "no" path from step 248 to a step 249 wherein the advance start is set equal to zero before proceeding to exit step 250.

Referring again to step 270, in the event that percent future heating demand is not greater than minimum heat demand, the processor would proceed along the no path to step 272 and set advance start equal to zero before proceeding to exit step 250 where the processor would return to step 121 and proceed to the next step.

Referring again to step 264, in the event that the current time is not greater than or equal to the cool start time, $t_c$ determined in step 259 then the processor will proceed along the no path to step 272. The processor will set advance start equal to zero in step 272 before proceeding to exit step 250 where the processor would return to step 121 and proceed to the next step.

Referring again to step 116 in FIG. 2A, in the event that the percent cooling requirement is not greater than the percent heating requirement, then the processor will proceed to a step 122 and determine if both the percent cooling and the percent heating equal zero. If both are equal to zero, the processor will proceed to a step 124 and set system demand equal to none before proceeding to execute the advance start routine in step 121. Referring to the advance start subroutine, the processor will first inquire as to whether percent heating requirement is equal to or greater than percent cooling requirement. Since the percent heating requirement will equal percent cooling requirement, the processor will proceed as appropriate through steps 236–272 as has been previously discussed with respect to the processor executing the advance start routine out of step 115. In this regard, all paths premised on percent cooling requirement not being greater than percent heating requirement will be elected where encountered. This will result in either a system demand being possibly set equal to heat if step 251 is encountered or being set equal to cool, if step 266 is encountered. In either case, the advance start will have been set equal to one. Finally, it is to be noted that system demand will remain equal to none in the event that neither step 151 or step 266 is encountered. The advance start will be equal to zero when this occurs. In all cases, the processor will eventually proceed out of step 250 and back to step 121 wherein it will proceed to the next step downstream of step 121.

Referring to step 128 in FIG. 2B, it is to be appreciated that the processor will have proceeded from either step 114, step 115, step 120 or step 121 to this step with a particular setting of system demand. The processor will also have proceeded to this step from step 122 without changing the present system demand established previously. For instance, if the "system demand" is "none" as a result of its initial setting in step 100, then it will continue to be so after exiting step 122 along the "no" path. If on the other hand, the "system demand" were previously set in a prior execution of the logic, then that would be the system demand setting after exiting step 122 along the "no path".

It is noted that the processor inquires as to whether the system demand equals none in step 128. Assuming the system demand is heat as a result of either step 114, step 115 or step 121, the processor will proceed along the no path out of step 128 to a step 130 and inquire as to whether the value of system demand equals the value of "system mode". Assuming further that the processor is operating immediately after initialization, then the system mode value will be none prompting the processor to proceed along the no path to a step 132.

Referring to step 132, the processor will inquire whether the value of system mode is equal to none. Since system mode will be equal to none initially, the processor will proceed along the yes path to a step 134 and read the water temperature from sensor 52 in the return line of the system. The processor proceeds in a step 136 to inquire as to whether the water temperature read in step 134 is greater than ten degrees Centigrade and less than thirty-two degrees Centigrade. If the system is not recovering from any previous heating or cooling mode of operation, the water temperature in the return line should be within this range of temperatures. This will prompt the processor to proceed along the yes path to a step 138 wherein inquiry is made as to whether system demand is equal to cool. Since it has been assumed that the system demand was set equal to heat in either step 114, step 115 or step 121, the processor will proceed out of step 138 along the no path to a step 140 and set the two way valve 14 to heating. The processor will activate pump 48 and deactivate pump 50 in a step 142 before proceeding to step 144 wherein the boiler 12 is activated.

The processor proceeds to set "system mode" equal to heat in a step 145. The processor will proceed from step 145 to a step 146 and send the system mode setting of "heat' to the zone controllers 24, 30, and 34. The processor will also send the "advance start" setting to each zone controller in a step 147. Each zone controller will use the communicated settings of system mode and advance start to determine how to position its control valve. In this regard, if the local demand is for heating, then the control valve will be positioned by the zone controller so as to deliver hot water from the boiler to the heat exchanger. If the local demand is however for cooling, then the hot water from the boiler will bypass the heat exchanger. If the local controller receives an advance start setting of one, then it will inquire as to whether the next future setpoint is greater than the current zone temperature. If the answer is yes, then the local zone controller will position its control valve as though heating is presently being required. It is to be appreciated that the above assumes that the local zone controller is not able to independently determine whether the water being delivered is hot or cold. In the event that the zone controllers possess the capability of independently determining the temperature of the water being delivered, then they will implement the positioning of their respective control valves without the need to receive the system mode setting from the system controller 44.

The processor will proceed from step 147 to a step 148 wherein a predefined time delay will be implemented before returning to step 102. It is to be appreciated that the amount of time delay will be an arbitrary timed amount for a given system so as to delay the system controller before it again polls the zone controllers in step 102.

Referring again to steps 102–124, the processor within the system controller will poll the zone controllers and thereafter create the array of FIG. 3 before computing the percentages of zone controllers having heat demands and the percentage of zone controllers having cooling demands. The processor will again determine whether or not the percentage heating requirement is greater than the percentage cooling requirement in a step 110. Assuming that the zone controllers continue to have essentially the same current heating demands, then the percent heating requirement will continue to remain the same as when step 110 was previously encountered. This will prompt the processor to again run through its options as it did previously and set the system demand equal to heat either as a result of executing step 114, or as a result of executing step 115, or step 121. It is to be noted that setting the system demand equal to heat in steps 115 or 121 will require the requisite number of heat start times to have been computed from the information produced by the zone controllers so as to exceed the minimum heat demand. The processor will proceed to step 128 and again inquire as to whether the system demand is equal to none. Since the system demand will be equal to heat, the processor will proceed to step 130 and inquire as to whether system demand equals system mode. Since system mode will now be equal to heat, the processor will proceed along the yes path to a step 150 and inquire as to whether system mode equals heat. Since system mode will be equal to heat, the processor will proceed to a step 152 and increment a "heat run timer". The heat run timer will be incremented for the first time since the heat run timer was initially set equal to zero. It is to be appreciated that the amount by which the heat timer will be incremented will preferably be the same as the amount of delay set forth in step 146 between successive executions of the control logic. The processor will proceed from step 152 to step 148 wherein the delay will be again implemented before returning to step 102.

It is to be appreciated that the processor within the system controller will continue to execute the control logic in the manner that has been previously discussed until there has been a change in the current or future demands of the zone controllers that would cause a change in the system demand setting from "heat" to "cool". This could occur if the percent cooling requirement as computed in step 108 increases to a value greater than both the percent heating requirement calculated in step 106 and the minimum cooling requirement in step 118. This will prompt the processor to proceed through steps 118 and 119 and set the system demand equal to "cool" in step 120.

A change in the system demand setting could also occur even if the current percent cooling requirement as computed in step 108 does not exceed the percent heating requirement or the minimum cooling requirement. In this regard, the processor could cause a change in system demand from "heat" to "cool" when implementing the advance start routine as required in either step 115 or 121. In either of these situations, the processor would have to note that the percent future cooling demand as computed in step 256 exceeded the minimum cool demand in step 258 of the advance start routine. The processor would furthermore have to determine in step 264 that the current time of the system clock was greater than the cool start time "$t_c$" as defined in step 260 of the advance start routine. If this occurred, then the processor would set system demand equal to "cool" in step 266. In this case, the advance start would be set equal to one in step 267.

Since system demand will now be equal to cool, the processor will proceed along the no path out of step 128 to step 130 and inquire as to whether system demand still equals the value of system mode. Since system demand will have changed from heat to cool, the processor will proceed along the no path to step 132 and inquire as to whether system mode equals none. Since system mode will still be equal to heat, the processor will proceed along the no path to step 154 and inquire as to whether system mode equals heat. Since system mode will still be equal to heat, the processor will proceed to step 156 and inquire as to whether heat run timer is greater than minimum heat run. It will be remembered that the heat run timer will have been successively incremented in step 152 each time the processor within the system controller executes the control logic of FIG. 2. Assuming that the system of FIG. 1 has been in a heating mode of operation for a considerable period of time, the heat run timer will normally exceed any minimum amount of time established for a heat run of the system of FIG. 1. It is to be appreciated that this particular time value for minimum heat run will be stored in memory for use by the processor within the system controller. Assuming that the heat run timer has exceeded this minimum heat run value, the processor will proceed to a step 158 and stop the operation of the boiler 12. It is to be appreciated that this may be a signal from the system controller to the burner control within the boiler 12.

The processor will proceed from step 158 to a step 160 and set the changeover timer. The change over timer will be set equal to a predetermined changeover time period, δ that the system of FIG. 1 must experience before it can be switched from heating to cooling or vice versa. This changeover time period will have been stored in memory associated with the processor. The processor will proceed in a step 162 to set system mode equal to none and both heat run timer and cool run timer equal to zero. The processor will then proceed to step 148 and again implement the prescribed amount of delay before the next execution of the control logic.

At such time as the next execution occurs, the processor will again poll the zone controllers in a step 102 and compute the percentage heat requirement and cooling requirement in steps 106 and 108 and compare percent cooling requirement to percent heating requirement in step 110–116. As has been previously discussed, the processor could again proceed to set system demand equal to cool in step 120 as a result of the current percent cooling requirement being greater than percent heating requirement and minimum cool demand. As has also been previously discussed, the processor could again proceed to set system demand equal to cool in step 267 of the advance start routine if the current time continues to exceed cool start time $t_c$. In either of the above scenarios, the processor will again proceed through step 128 to step 130. Since system demand will not equal system mode at this time, the processor will proceed along the no path to step 132 to inquire whether system mode equals none. Since system mode will have been previously set equal to none in step 162, during the previous execution of the control logic, the processor will proceed along the yes path to step 134 and read the water temperature from the water temperature sensor 52 in the return line of the system. The processor will proceed to inquire as to whether the water temperature read from sensor 52 is between the range of temperatures set forth in step 136. Since the boiler will have just recently been turned off, the water temperature in the return line should be above thirty two degrees Centigrade so as to prompt the processor to proceed along the no path out of step 136 to a step 164 and inquire as to whether the changeover timer set in step 160 is equal to zero. The changeover timer will have just been set equal to a predetermined changeover time in the previous execution of the control logic. This will prompt the processor to proceed along the no path to a step 166 and decrement the changeover time previously loaded into the change over timer. It is to be appreciated that the amount of time thereby decremented will be essentially the delay time defined by step 148 between successive executions of the control logic.

The processor proceeds from step 166 to step 148 wherein the delay is again implemented before the next successive execution of the control logic.

It is to be appreciated that successive executions of the control logic will occur as long as information from the zone controllers continues to produce a result leading to system demand being set equal to cool. At some point during these successive executions of the control logic, the processor may note in step 136 that the water temperature in the return line is within the range of the temperatures set forth in step 136. On the other hand, the processor may note that the changeover timer has been decremented to zero in step 164 before the water temperature in the return line is within range. In either case, the processor will proceed from step 136 or step 164 to step 138 and inquire as to whether the system demand equals cool. Since the system demand will have been continually set equal to cool each time step 120 or step 266 are encountered, the processor will proceed to step 168 and set the two way valve 14 to a cooling position. The processor will thereafter proceed to step 170 and activate the pump 50 and deactivate the pump 48. The processor will then proceed to a step 172 and start the chiller 10. The processor will thereafter set the system mode equal to cool in a step 174. The processor will proceed to send the system mode setting of "cooling' to the zone controllers 24, 30, and 34 in step 175. The processor will also send the "advance start" setting to each zone in step 147. Each zone controller will use the communicated settings of system mode and advance start to determine how to position its respective control valve. In this regard, if the local demand is for cooling, then the control valve will be positioned by the zone controller so as to deliver cooled water from the chiller to the heat exchanger. If the local demand is however for heating, then the cooled water from the chiller will bypass the heat exchanger. If the local controller receives an advance start setting of one, then it will inquire as to whether the next future setpoint is greater than the current zone temperature. If the answer is yes, then the local controller will position its control valve as though cooling is presently required. It is to be appreciated that the above assumes that the local zone controller is not able to independently determine whether the water being delivered is hot or cold. In the event that the zone controllers possess the capability of independently determining the temperature of the water being delivered, then they will implement the positioning of their respective control valves without the need to receive the system mode setting from the system controller 44.

It is hence to be appreciated that the control logic will have implemented a changeover from heating to cooling in the event that the changeover time as defined by the changeover timer elapses or in the event that the water temperature sensor is within the predefined range of water temperatures in step 136. It is furthermore to be appreciated that the control logic can possibly implement a changeover from cooling back to heating. This could occur if the current percentage heating requirement exceeds the percentage cooling requirement at some point during the successive executions of control logic. This will prompt a further examination as to whether the percent current heating requirement exceeds minimum demand. Assuming that the minimum heat demand is exceeded, the system demand will be set equal to heat in step 114. This will prompt the processor to proceed through steps 128, 130, and 132 to step 154 to inquire whether the system mode is equal to heat. Since the system mode will still be equal to cool, the processor will proceed from step 154 along the no path to step 174 to inquire whether the system mode is equal to cool.

Since system mode will still be equal to cool, the processor will proceed to a step 176 to inquire whether the cool run timer is greater than the minimum cool run time. If the cool run timer has not been sufficiently incremented so as to exceed the minimum cool run time, the processor will proceed to step 178 and increment the cool run timer before returning to step 148. The processor will again execute the aforementioned logic including step 114 until the cool run timer exceeds the minimum cool run time. At this point, the processor will proceed to stop the chiller 10 before setting the changeover timer equal to δ in step 160. The processor will proceed to step 162 and set system mode equal to none and heat run timer and cool run timer equal to zero. The processor will proceed to step 148 and implement the delay before again polling the zone controllers in step 102. Assuming that the polling continues to indicate that percentage heating requirement exceeds percentage cooling requirements, then the processor will proceed though steps 110–114 and hence to steps 128, 130 and to step 132. Since the system mode is now equal to none, the processor will proceed to implement steps 134, 136, and steps 164–166 and then step 148 until such time as the water temperature read in step 134 is within range or the changeover timer has been decremented to zero. At such time, the processor will proceed to step 138 and hence to steps 140–146 so as to change the system to a heating mode of operation.

Referring again to step 116, it is to be noted that there may a situation wherein the particular polling by the processor will indicate that there is neither a predominance of current heating or cooling being required by the zone controllers. In this case, the processor will proceed to step 122 and inquire as to whether the percent cooling requirement and the percent heating requirement are both equal to zero. It is to be noted that this would be the case if the building being heated or cooled is not occupied and all setpoints have been adjusted within the zone controllers so as to not call for either heating or cooling. If this occurs, the processor will proceed to set the system demand equal to none in a step 124 The processor will proceed to step 121 and initiate the advance start routine. Referring to step 234 of the advance start time routine, the processor will inquire as to whether percent heating requirement is greater than percent cooling requirement. Since the percent heating requirement is equal to percent cooling, the processor should proceed to step 254. Referring to step 254, the processor will compute the number of zones having current cool demand equal to true plus the number of zones having cool start times not equal to none. Since the zones will have no current cool or heat demands, the array of information from the zones should have future heat start times, $t_{hi}$, and future cool start times, $t_{ci}$, equal to none or particular computed values as a result of implementing the logic of FIG. 4 This should prompt the processor to compute a percent future cooling demand that is based on future cool start times not equal to none in step 254. The processor will inquire as to whether percent future cooling demand exceeds minimum cool demand in step 258. If the answer is yes, then the processor will proceed to step 259 and determine the earliest cool start time, $t_{ci}$, that will produce the first percent future cooling demand that is greater than the minimum cool demand. Since there will not be any current cool demands, the processor will determine how many cool start times need to be counted in order to exceed the minimum demand. The processor will proceed to successively select the the next earliest cool start time $t_{ci}$ until the number of selected cool start times exceed the minimum cool demand. The processor will proceed to inquire whether the system clock time is greater than the determined cool start time $t_c$ in step 264.

At some point, the current time of the system clock may be greater than or equal to the determined cool start time, $t_c$. If this occurs, the processor will proceed to step 248 and set "system demand" equal to cool. The processor will proceed to set "advance start" equal to one in step 264 before proceeding to exit step 250 and returning to step 121.

The processor will proceed from step 121 to step 128 and inquire as to whether system demand is equal to none. Since system demand will be equal to cool out of the advance start routine of step 121, the processor will proceed along the no path to step 130 and inquire whether system demand equals system mode. Since system mode will be equal to none at this time, the processor will proceed along the no path to step 132 and hence to step 136. Assuming that the water temperature is within range, the processor will proceed from step 136 to step 138 and inquire as to whether system demand equals cool. Since it does, the processor will activate pump 50 and deactivate pump 48 in step 17 before starting the chiller 10 in step 172. The processor will set system mode equal to cool in step 174 before sending the system mode setting to the controllers as has been previously described. The advance start signal will also be sent to the zone controllers. Each zone controller will hence receive the advance start setting of one. This will prompt each local controller to inquire as to whether the next future setpoint is less than the zone temperature. If the answer is yes, then the local zone controller will position its control valve as though cooling is presently being required.

The processor will proceed from step 147 to step 148 wherein a predefined time delay will be implemented before returning to step 102. As has been previously discussed, the logic of FIGS. 2A, 2B and 2C will again be implemented with the advance start routine of FIGS. 5A, 5B and 5C dictating the continued cooling of the zones in advance of occupancy due to the provision of cooled water from the chiller beginning at start time $t_c$. The provision of cooled water will continue to occur as long as the computed future cooling demands based on the number of zones having future cool start times continues to exceed minimum cool demand and the system clock time exceeds the determined cool start time of step 260.

It is to be appreciated that if any zone were at some point to produce a current cool demand, then the processor will not proceed to step 121 via steps 122 and 124. It will instead proceed through steps 110, 116, 118 and hence to step 121 wherein the advance start routine would again be encountered. In this case, the advance start routine will be computing the number of zones having current cool demands equal to true plus the number of zones having cool start times not equal to none. Assuming the number of current cooling demands and future cool start times exceeds minimum cool demand, the processor will determine a cool start time in step 260. Assuming further that the system clock is grater than the determined cool start time, then the processor will continue to set system demand equal to cool in step 266 and maintain the advance start equal to one in step 267.

It is to be appreciated that at some point the percent future cooling demand may not exceed minimum cool demand either while implementing the advance start routine through step 121 via step 122 or via step 118. It is also to be appreciated that the system clock may not exceed the determined cool start time. In any of the situations, the processor would set advance start back to zero in step 272 before proceeding out of the advance start routine.

It is also to be appreciated that the logic of FIGS. 2A, 2B and 2C may at some point rely mostly on current cooling demands as the building becomes occupied. When this occurs, the advance start routine of step 121 may not be encountered at all.

It is still furthermore to be appreciated that the advance start routine initiated through step 121 could also result in the system demand being set equal to heating in the event that step 121 is encountered out of step 118. In this case, current percent heating requirement would have to be less than the current percent cooling requirement prompting the processor to proceed out of step 234 to step 254 and hence through step 256 to step 258. The percentage future cooling demand would have to not be greater than the minimum cool demand in step 258. If this occurs during execution of the advance start routine, then the number of zone controllers having current demands equal to true plus the number of heat start times, "$t_{hi}$" not equal to none would be computed in step 268. The resulting number would be used to compute a percentage future heating demand in step 269. The processor would proceed to inquire as to whether percent future heating demand is greater than the minimum heat demand. If the answer is yes, then the processor would proceed to determine earliest heat start time "$t_h$" in step 242. The processor would normally proceed to set advance start equal to zero until the system clock time exceeds heat start time $t_h$. When this occurs, the processor will set system demand equal to heat in step 251 and set advance start equal to one in step 252. The system of FIG. 1 would thereafter be set into a heating mode before occupancy.

It is even still furthermore to be appreciated that the advance start routine initiated through step 121 could also result in the system demand being set equal to heating in the event that step 121 is encountered out of step 122. In this case, percentage current heating would have to be equal to percentage current cooling prompting the processor to proceed along the yes path out of step 234 to step 236. The number of heat start times, "$t_{hi}$" not equal to none would be computed in step 236. The resulting number would be used to compute a percentage future heating demand in step 238. The processor would proceed to inquire as to whether percent future heating demand is greater than the minimum heat demand in step 240. If the answer is yes, then the processor would proceed to determine earliest heat start time "$t_h$" in step 242. The processor would normally proceed to set advance start equal to zero until the system clock time exceeds heat start time $t_h$. When this occurs, the processor would set system demand equal to heat in step 251 and set advance start equal to one in step 252. The system of FIG. 1 would thereafter be set into a heating mode before occupancy.

Referring again to step 122, in the event that the percent cooling requirement and percent heating requirement do not equal zero, the processor will proceed to step 128. Since the system requirements and system mode will be whatever was previously determined, the processor will proceed to step 130 where it will then proceed along the yes path and increment the appropriate run timer for whatever mode it is currently in.

It is to be appreciated that a preferred embodiment of the invention has been disclosed. Alterations or modifications may occur to one of ordinary skill in the art. For instance, the control logic may be altered so as to not require a sensing of water temperature in the return line. In this case, the changeover time would be the governing factor as to whether a changeover would be allowed to occur. Furthermore, the heating demands $H\_D_1$ or the cooling demands $C\_D_1$ may be computed within the system controller based upon receiving information as to present temperature and setpoint from each zone controller.

It will be appreciated by those skilled in the art that further changes could be made to the above-described invention without departing from the scope of the invention. Accordingly, the foregoing description is by way of example only and the invention is to be limited only by the following claims and equivalents thereto

What is claimed is:

1. A process for controlling the provision of conditioned water to a plurality of heat exchangers, under the control of zone controllers, said process comprising the steps of:

periodically polling the plurality of zone controllers for the heat exchangers to obtain information concerning current and future demands for heating or cooling by the zone controllers;

determining whether there is a sufficient predominance of current heating demands from said zone controllers;

determining whether there is a sufficient predominance of current and future demands for heating from said zone controllers when there is not a sufficient predominance of current heating demands;

providing heated water to the heat exchangers in response to a determination that there is a sufficient predominance of current demands for heating or if there is a sufficient predominance of current and future demands for heating from said zone controllers;

determining whether there is a sufficient predominance of current cooling demands from said zone controllers;

determining whether there is a sufficient predominance of current and future demands for cooling from said zone controllers when there is not a sufficient predominance of current cooling demands; and providing cooled water to the heat exchangers in response to a determination that there is a sufficient predominance of current demands for cooling or if there is a sufficient predominance of current and future demands for cooling from said zone controllers.

2. The process of claim 1 further comprising the step of:

storing in a system controller the information obtained from the zone controllers; and computing a future heat or cooling demand for any zone controller not having a current heating or cooling demand.

3. The process of claim 2 wherein said step of computing a future heating or cooling demand comprises the step of:

computing a heat start time or a cool start time for any zone controller not having a current heating or cooling demand.

4. The process of claim 3 wherein the information obtained from each zone controller includes the next future setpoint and associated start time for the next future setpoint for each zone controller, a currently sensed temperature for the zone associated with the zone controller, and the heat and cooling factors for the respective zone controller wherein the heat factor defines the amount of time necessary to raise the sensed temperature in the respective zone by one degree and the cooling factor defines the amount of time necessary to lower the sensed temperature in the respective zone by one degree and wherein any heat start time for a zone controller is computed as a function of the difference between the next future setpoint for the zone controller and the current temperature for the zone controller, the difference being multiplied by the heating factor for the zone controller and wherein any cool start time for a zone controller is computed as a function of the difference between the current temperature and the next future setpoint for the zone controller, the difference being multiplied by the cooling factor.

5. The process of claim 3 wherein said step of determining whether there is a sufficient predominance of current and future demands for heating from said zone controllers comprises the steps of:

adding the number of current heat demands in the array of information to the number of heat start times in the array; and     comparing the added number of current heat and future heat start times with a minimum level of required heat demands; and     wherein said step of determining whether there is a sufficient predominance of current and future demands for cooling from said zone controllers comprises the step of:

adding the number of current cool demands in the array of information to the number of cool start times in the array; and         comparing the added number of current cool demands and future cool start times with a minimum level of required cool demands.

6. The process of claim 5 further comprising the steps of:

determining a start time for providing heated water to any heat exchanger associated with a zone controller having a current or future heating demand when there is a sufficient predominance of current and future heating demands; and     determining a start time for providing cooled water to any heat exchanger associated with a zone controller having a current or future cooling demand when there is a sufficient predominance of current and future cooling demands.

7. The process of claim 6 wherein said step of determining a start time for providing heated water to any heat exchanger associated with a zone controller having a current or future heating demand comprises the steps of:

determining the number of current heat demands in the stored information;

determining the number of computed heat start times that need to be counted and combined with the number of current heat demands in the stored information in order to exceed a minimum number of zone controllers necessary to provide heated water;

successively selecting the next to occur heat start time until the number of start times that needed to be counted have been counted; and     selecting the last successively selected next to occur heat start time as the start time for providing heated water.

8. The process of claim 7 wherein said step of determining a start time for providing cooled water to any heat exchanger associated with a zone controller having current or future cooling demand comprises the steps of:

determining the number of current cool demands in the stored information;

determining the number of cool start times that need to be counted and combined with the number of current cooling demands in the stored information in order to exceed a minimum number of zone controllers necessary to be demanding current or future cooling in order to provide cooled water;

successively selecting the next to occur cool start time until the determined number of cool start times that need to be counted have been counted; and     selecting the last successively selected next to occur cool start time as the start time for providing cooled water.

9. The process of claim 1 further comprising the steps of:

switching from providing heated water to providing cooled water to the heat exchangers in response to a determination that the information being received from said zone controllers is continually indicating a sufficient predominance of current or a sufficient predominance of current and future demands for cooling over a predetermined period of time; and     switching from providing cooled water to providing heated water to the heat exchangers in response to a determination that the information being received from said zone controllers is continually indicating a sufficient predominance of current or a sufficient predominance of current and future demands for heating over a predetermined period of time.

10. The process of claim 9 further comprising:

switching to providing cooled water before the predetermined period of time has elapsed in the event that the water being returned for further conditioning is within a predefined range of temperatures; and     switching to providing heated water before the predetermined period of time has elapsed in the event that the water being returned for further conditioning is within a predefined range of temperatures.

11. The process of claim 10 further comprising the steps of:

initiating a tracking of the predetermined period of time that must elapse before the switching to either providing cooled water or the switching to providing heated water; and     delaying said step of initiating the tracking of the predetermined period of time that must elapse before the switching in the event that a second predetermined period of time has not elapsed since the current provision of heated or cooled water to the heat exchanger was initiated.

12. The process of claim 11 wherein said step of providing heated water comprises activating a heating source and wherein said step of providing cooled water comprises activating a cooling source and wherein said step of switching from providing heated water to providing cooled water to the heat exchangers comprises deactivating the cooling source and thereafter activating the heating source after the predetermined period of time has elapsed and wherein said step of switching from providing cooled water to providing heated water comprises deactivating the heating source and thereafter activating the cooling source after the predetermined period of time has elapsed.

* * * * *